US008343657B2

(12) United States Patent
Minami et al.

(10) Patent No.: US 8,343,657 B2
(45) Date of Patent: Jan. 1, 2013

(54) NEGATIVE ELECTRODE FOR LITHIUM SECONDARY BATTERY, METHOD OF MANUFACTURING THE ELECTRODE, AND LITHIUM SECONDARY BATTERY

(75) Inventors: Hiroshi Minami, Kobe (JP); Atsushi Fukui, Kobe (JP); Yasuyuki Kusumoto, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 153 days.

(21) Appl. No.: 11/657,092

(22) Filed: Jan. 24, 2007

(65) Prior Publication Data

US 2007/0172733 A1    Jul. 26, 2007

(30) Foreign Application Priority Data

Jan. 24, 2006   (JP) ................................ 2006-014514
Feb. 28, 2006   (JP) ................................ 2006-051438

(51) Int. Cl.
*H01M 4/58* (2010.01)

(52) U.S. Cl. .................................... 429/218.1; 429/217

(58) Field of Classification Search ............... 429/218.1, 429/232, 245, 217; 252/182.1; 427/58
See application file for complete search history.

(56) References Cited

U.S. PATENT DOCUMENTS

| 5,888,672 | A | * | 3/1999 | Gustafson et al. | ............ | 429/314 |
|---|---|---|---|---|---|---|
| 5,989,745 | A | * | 11/1999 | Kamauchi et al. | ............ | 429/223 |
| 6,001,507 | A | * | 12/1999 | Ono et al. | .................... | 429/217 |
| 2005/0221189 | A1 | * | 10/2005 | Yoshida et al. | ........... | 429/231.95 |
| 2007/0298325 | A1 | * | 12/2007 | Kubota et al. | ................. | 429/316 |

FOREIGN PATENT DOCUMENTS

| JP | 2002-260637 A | 9/2002 |
|---|---|---|
| JP | 2006-4634 A | 1/2006 |

* cited by examiner

*Primary Examiner* — Jennifer K Mlchener
*Assistant Examiner* — Monique Wills
(74) *Attorney, Agent, or Firm* — McDermott Will & Emery LLP (57) ABSTRACT

In a lithium secondary battery using a negative electrode having a negative electrode mixture layer formed on a surface of a negative electrode current collector, the mixture layer made of a binder and negative electrode active material particles of silicon and/or a silicon alloy, charge-discharge cycle performance is improved without degrading the capacity per unit volume, by making the negative electrode mixture layer sufficiently adhere to the negative electrode current collector. The negative electrode has a negative electrode mixture layer composed of a binder and negative electrode active material particles of silicon and/or a silicon alloy. The negative electrode mixture layer is formed on a surface of the negative electrode current collector by sintering. Negative electrode active material particles are partially embedded in the negative electrode current collector.

19 Claims, 5 Drawing Sheets

NEGATIVE ELECTRODE FOR LITHIUM SECONDARY BATTERY, METHOD OF MANUFACTURING THE ELECTRODE, AND LITHIUM SECONDARY BATTERY

BACKGROUND OF THE INVENTION

1. Field of the Invention

The present invention relates to lithium secondary batteries, negative electrodes for the lithium secondary batteries, and methods of manufacturing negative electrodes. More particularly, the invention relates to a lithium secondary battery that employs a negative electrode comprising a negative electrode current collector and a negative electrode mixture layer formed on the negative electrode current collector, the negative electrode mixture layer containing a binder and negative electrode active material particles of silicon and/or a silicon alloy, and specifically to an improvement in the negative electrode for the lithium secondary battery so that charge-discharge cycle performance can be improved.

2. Description of Related Art

In recent years, a lithium secondary battery using a non-aqueous electrolyte and which performs charge-discharge operations by transferring lithium ions between its positive and negative electrodes has been in use as a new type of high power, high energy density secondary battery.

One type of negative electrode that is used for such a lithium secondary battery is a negative electrode that has a negative electrode current collector and a negative electrode mixture layer formed on a surface of the negative electrode current collector, the negative electrode mixture layer containing a binder and a material capable of alloying with lithium.

In a lithium secondary battery that has a negative electrode using a material capable of alloying with lithium as its active material, however, the negative electrode active material expands and shrinks in volume during the occlusion and release of lithium as the lithium secondary battery undergoes charge-discharge cycles, causing the negative electrode active material to pulverize or peel off from the current collector. This leads to the problem of degradation in current collection performance of the negative electrode, which consequently results in degradation in charge-discharge cycle performance of the lithium secondary battery. The expansion and shrinkage of the negative electrode active material in volume is exacerbated especially when silicon and/or a silicon alloy, which show excellent capability of occluding and releasing lithium, is/are used as the material which alloys with lithium for the purpose of enhancing the capacity of the lithium secondary battery. Consequently, the use of silicon and/or a silicon alloy tends to worsen the problems of degradation in battery capacity during early stages of charge-discharge cycle operations, and of degradation in the charge-discharge cycle performance of the battery.

In recent years, a negative electrode for a lithium secondary battery has been suggested that can improve charge-discharge cycle performance of a lithium secondary battery. The negative electrode comprises a negative electrode current collector made of a conductive metal foil, and a negative electrode mixture layer formed on a surface of the negative electrode current collector that has been roughed so that the surface roughness Ra is 0.2 µm or greater. The negative electrode mixture layer is composed of a binder and negative electrode active material particles of silicon and/or a silicon alloy, and the negative electrode mixture layer is formed by sintering under a non-oxidizing atmosphere. This configuration enhances adhesion between the negative electrode mixture layer and the negative electrode current collector, and thus improves charge-discharge cycle performance of the lithium secondary battery. (See, for example, Japanese Published Unexamined Patent Application No. 2002-260637.)

However, even with the just-described negative electrode for a lithium secondary battery, adhesion between the negative electrode mixture layer and the negative electrode current collector is not necessarily sufficient. Moreover, when the surface roughness of the negative electrode current collector is increased for the purpose of enhancing the adhesion between the negative electrode mixture layer and the negative electrode current collector, the thickness of the negative electrode current collector accordingly increases, resulting in the problem of degradation in the capacity per unit volume of the lithium secondary battery.

BRIEF SUMMARY OF THE INVENTION

Accordingly, it is an object of the present invention to resolve the foregoing problems in a lithium secondary battery that employs a negative electrode comprising a negative electrode current collector and a negative electrode mixture layer formed on a surface of the negative electrode current collector and composed of a binder and negative electrode active material particles of silicon and/or a silicon alloy.

Specifically, it is an object of the present invention to further improve adhesion between the negative electrode current collector and the negative electrode mixture layer composed of negative electrode active material particles of silicon and/or a silicon alloy in the above-described lithium secondary battery so that the negative electrode mixture layer is sufficiently adhered to the negative electrode current collector even without increasing the surface roughness of the negative electrode current collector, whereby charge-discharge cycle performance of the lithium secondary battery is improved without degrading the capacity per unit volume of the battery and moreover the capacity degradation in early stages of charge-discharge cycle operations is lessened.

In order to accomplish the foregoing and other objects, the present invention provides a negative electrode for a lithium Secondary battery, comprising: a negative electrode current collector; and a negative electrode mixture layer sintered on a Surface of the negative electrode current collector and composed of a binder and negative electrode active material particles of silicon and/or a silicon alloy, wherein negative electrode active material particles are partially embedded in the negative electrode current collector.

In the negative electrode for a lithium secondary battery according to the present invention, negative electrode active material particles of silicon and/or a silicon alloy are partially embedded in the negative electrode current collector, and the negative electrode mixture layer composed of the negative electrode active material particles and the binder is formed on a surface of the negative electrode current collector by sintering. Therefore, the adhesion capability of the negative electrode mixture layer to the negative electrode current collector improves, and the negative electrode mixture layer can sufficiently adhere even to a negative electrode current collector the surfaces of which are not roughened. Thus, the negative electrode mixture layer is sufficiently prevented from peeling off from the negative electrode current collector.

In addition, according to the present invention, a lithium secondary battery is provided that employs the above-described negative electrode for a lithium secondary battery. Therefore, the negative electrode mixture layer is adequately prevented from peeling off from the negative electrode current collector when the lithium secondary battery is repeatedly charged and discharged, and consequently, cycle life of the lithium secondary battery is improved. In particular, in the case of using a negative electrode current collector the surfaces of which are not roughened, the thickness of the negative electrode current collector can be reduced and the capacity per unit volume of the lithium secondary battery can be increased, in addition to the cycle life of the lithium secondary battery being improved.

DETAILED DESCRIPTION OF THE INVENTION

A negative electrode for a lithium secondary battery according to the present invention comprises a negative electrode current collector; and a negative electrode mixture layer sintered a surface of the negative electrode current collector and composed of a binder and negative electrode active material particles of silicon and/or a silicon alloy. In the negative electrode, negative electrode active material particles are partially embedded in the negative electrode current collector.

The just-described negative electrode for a lithium secondary battery may be manufactured by a manufacturing method Comprising applying a negative electrode mixture slurry composed of a binder and negative electrode active material particles of silicon and/or a silicon alloy onto a surface of a negative electrode current collector, to form a negative electrode mixture layer; pressure-rolling the negative electrode current collector on which the negative electrode mixture layer is formed, to partially embed negative electrode active material particles into the negative electrode current collector; and sintering the negative electrode mixture layer.

Pressure-rolling the negative electrode current collector provided with the negative electrode mixture layer so as to partially embed negative electrode active material particles into the negative electrode current collector serves to increase the contact area between the negative electrode mixture layer and the negative electrode current collector and to improve adhesion of the negative electrode mixture layer to the negative electrode current collector. This allows the negative electrode mixture layer to sufficiently adhere even to a negative electrode current collector the surfaces of which are not roughened.

Here, when negative electrode active material particles are embedded in the negative electrode current collector, there is no particular limitation on how many of the negative electrode active material particles should be embedded in the negative electrode current collector, and it is sufficient that the negative electrode mixture layer has at least one negative electrode active material particle embedded at least at a depth of 0.1 μm, per a flat surface portion with a length of 1 mm of the negative electrode current collector.

Examples of the material for the negative electrode current collector include such metals as copper, nickel, iron, titanium, cobalt, and alloys thereof. It is especially preferable to use a metal foil containing elemental copper. For example, it is preferable to use one type of material selected among a foil made of copper or a foil made of a copper alloy, and a metal foil on a surface of which a layer of copper or a copper alloy is formed.

Herein, when the tensile strength of the negative electrode current collector is low, the negative electrode active material particles tend to be embedded in the negative electrode current collector easily. However, if the tensile strength of the negative electrode current collector is lower than 450 N/mm$^2$ after having been sintered, wrinkles or bends occur in the negative electrode current collector due to changes in volume of the negative electrode active material particles during charge and discharge, causing the negative electrode mixture layer to easily peel off from the negative electrode current collector. On the Other hand, if the tensile strength of the negative electrode current collector is too high, it becomes difficult to partially embed negative electrode active material particles into the negative electrode current collector, hindering the improvement in the adhesion between the negative electrode mixture layer and the negative electrode current collector. In addition, when the pressure is increased so that negative electrode active material particles can be partially embedded, the negative electrode active material particles are pulverized. For these reasons, it is preferable that the negative electrode current collector has a tensile strength of from 450 N/mm$^2$ to 1000 N/mm$^2$ after having been sintered.

The use of a negative electrode current collector having a small surface roughness, for example, a 10-point mean surface roughness Rz of less than 5 μm as determined according to JIS B 0601-1994, allows negative electrode active material particles to be partially embedded in the negative electrode current collector as described above, so that the negative electrode mixture layer sufficiently adheres to the negative electrode current collector. In addition, the use of a negative electrode current collector having a small surface roughness makes it possible to reduce the thickness of the negative electrode current collector in comparison with the case of using a negative electrode current collector having a large surface roughness and consequently to increase the capacity per unit volume of the lithium secondary battery.

It is recommended that the negative electrode active material particles used in the present invention consist of silicon and/or a silicon alloy, as described above. However, the particles may contain a material capable of alloying with lithium in addition to silicon and/or a silicon alloy. Examples of a material capable of alloying with lithium include germanium, tin, lead, zinc, magnesium, sodium, aluminum, gallium, indium, and alloys thereof. Nevertheless, in order to enhance the capacity of the negative electrode, it is preferable to use only silicon and/or a silicon alloy as the negative electrode active material particles, and particularly preferably silicon alone.

Usable silicon alloys include solid solutions of silicon and at least one other element, intermetallic compounds of silicon and at least one other element, and eutectic alloys of silicon and at least one other element. These alloys may be fabricated through, for example, arc melting, liquid quenching techniques, mechanical alloying, sputtering, chemical vapor deposition, and sintering.

The average particle size of the negative electrode active material particles is not particularly limited, but it is preferable that the average particle size be 100 μm or less, more preferably 50 μm or less, and most preferably 20 μm or less, since the smaller the particle size, the more pulverization of the negative electrode active material is prevented.

In order to enhance the adhesion of the negative electrode mixture layer to the negative electrode current collector, it is preferable to use a thermoplastic resin, more preferably a polyimide, as the binder for the negative electrode mixture layer.

If the amount of the binder in the negative electrode mixture layer is too small, it is difficult to sufficiently hold the negative electrode active material particles in the negative electrode mixture layer and to sufficiently enhance adhesion between the negative electrode mixture layer and the negative electrode current collector. On the other hand, if the amount of the binder is too low, the resistance of the negative electrode increases, and charging in early stages becomes difficult. For this reason, it is preferable that the volume of the binder in the negative electrode mixture layer be within the range of from 5% to 50%.

In the negative electrode for a lithium secondary battery according to the invention, it is preferable to add a conductive powder to the negative electrode mixture layer, in order to enhance electrical conductivity between the negative electrode active material particles within the negative electrode mixture layer and between the negative electrode active material particles and the negative electrode current collector so that the current collection performance of the negative electrode can be further improved.

By adding the conductive powder to the negative electrode mixture layer, a conductive network is formed around the negative electrode active material particles, and degradation in capacity during early stages of charge-discharge cycle operations is prevented.

It is preferable that the conductive powder be made of a conductive carbon material or a substance made of the same material as the negative electrode current collector. It is particularly preferable to use graphite, which has high crystallinity and high conductivity among conductive carbon materials.

The average particle size of the conductive powder added to the negative electrode mixture layer is preferably, but not particularly limited to, within the range of from 1 μm to 10 μm. If the average particle size of the conductive powder exceeds 10 μm, the thickness of the negative electrode mixture layer correspondingly increases, making it impossible to construct a high energy density lithium secondary battery. On the other hand, if the average particle size of the conductive powder is less than 1 μm, the proportion of the binder that exists on the surface region of the conductive powder becomes too high, making it difficult to improve the contact between the negative electrode active material particles and the contact between the negative electrode active material particles and the negative electrode current collector. This reduces the effect of improving current collection performance of the negative electrode.

Likewise, if the amount of the conductive powder added to the negative electrode mixture layer is too high, the thickness of the negative electrode mixture layer increases, making it impossible to construct a high energy density lithium secondary battery. On the other hand, if the amount of the conductive powder is too low, it becomes impossible to sufficiently obtain the effect of improving current collection performance of the negative electrode by enhancing the contact between the negative electrode active material particles and the contact between the negative electrode active material particles and the negative electrode current collector. For these reasons, it is preferable that the amount of the conductive powder added to the negative electrode mixture layer be within the range of from 0.1 weight % to 10 weight % with respect to the total weight of the negative electrode mixture layer.

When manufacturing the negative electrode for a lithium secondary battery, it is preferable to sinter the negative electrode mixture layer, in which negative electrode active material particles are partially embedded in the negative electrode current collector, at a temperature that is at least 20° C. higher than the glass transition temperature of the binder in the negative electrode mixture layer so that the binder is thermally bonded to the negative electrode current collector to sufficiently exhibit its anchoring effect. However, if the sintering is carried out at such a high temperature that the binder is decomposed, the adhesion between the negative electrode active material particles and the adhesion between the negative electrode mixture layer and the negative electrode current collector greatly decreases in the negative electrode mixture layer. Therefore, it is necessary that the sintering is performed at a temperature such that the binder is not decomposed. For example, when using a polyimide as the binder, it is preferable that the sintering be performed at 250 to 600° C., at which the polyimide is not completely decomposed.

When a copper foil is used as the negative electrode current collector, too high a temperature of the sintering causes the strength of the negative electrode current collector to greatly lower due to, for example, changes in the crystallinity of the copper. For this reason, the sintering should preferably be performed at 500° C. or lower, more preferably at 450° C. or lower.

As described above, it is preferable that the sintering be performed at a temperature that is at least 20° C. higher than the glass transition temperature of the binder in order to enhance the adhesion between the negative electrode mixture layer and the negative electrode current collector. Accordingly, when a copper foil is used as the negative electrode current collector, it is preferable to use a binder that has a glass transition temperature of 450° C. or lower.

When sintering the negative electrode mixture layer, in which negative electrode active material particles are partially embedded in the negative electrode current collector, it is preferable that the sintering be performed under a non-oxidizing atmosphere so that neither the negative electrode active material particles nor the negative electrode current collector is oxidized.

The lithium secondary battery according to the present invention comprises a positive electrode, a negative electrode, and a non-aqueous electrolyte, and the negative electrode is the above-described negative electrode for a lithium secondary battery.

The non-aqueous electrolyte usable for the lithium secondary battery of the present invention is not particularly limited and any non-aqueous electrolyte that is commonly used may be used. Examples include a non-aqueous electrolyte solution in which a solute is dissolved in a non-aqueous solvent, a gelled polymer electrolyte in which the just-mentioned non-aqueous electrolyte solution is impregnated in a polymer electrolyte such as polyethylene oxide or polyacrylonitrile, and an inorganic solid electrolyte such as LiI and $Li_3N$.

The non-aqueous solvent is also not particularly limited and any commonly used non-aqueous solvent may be used. Examples include a mixed solvent of a cyclic carbonate such as ethylene carbonate, propylene carbonate, and butylene carbonate, and a chain carbonate such as dimethyl carbonate, ethyl methyl carbonate, and diethyl carbonate, as well as a mixed solvent of a cyclic carbonate and an ether-based solvent such as 1,2-dimethoxyethane and 1,2-diethoxyethane.

The above-mentioned solute is not particularly limited and any commonly used solute may be used. Examples include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof.

The positive electrode active material used for the positive electrode is also not particularly limited and any commonly used positive electrode active material may be used. Examples include lithium-containing transition metal oxides such as $LiCoO_2$, $LiNiO_2$, $LiMn_2O_4$, $LiMnO_2$, $LiCu_{0.5}Ni_{0.5}O_2$, and $LiNi_{0.7}Co_{0.2}Mn_{0.1}O_2$, and a metal oxide that does not contain lithium, such as $MnO_2$.

EXAMPLES

Hereinbelow, examples of the negative electrode for a lithium secondary battery and the manufacturing method of the negative electrode, as well as the lithium secondary battery employing the negative electrode according to the present invention are described in detail along with comparative examples, and it will be demonstrated that the examples of the lithium secondary battery of the present invention exhibit improved cycle life. It Should be construed that the present invention is not limited to the following examples, and various changes and modifications are possible without departing from the scope of the invention.

Example 1

Example 1 uses a negative electrode, a positive electrode, and a non-aqueous electrolyte that were prepared in the following manner.

Preparation of Negative Electrode

Silicon powder (purity: 99.9%) having an average particle size of 15 μm was used as the negative electrode active material particles, and a polyimide was used as the binder. The negative electrode active material particles and the binder were mixed at a weight ratio of 9:1, and they were added to N-methyl-2-pyrrolidone. These were mixed together to thus prepare a negative electrode mixture slurry.

The negative electrode current collector was prepared using a rolled copper alloy foil made of a Cu—Ni—Si—Mg alloy containing 3 wt. % Ni, 0.65 wt. % Si, and 0.15 wt. % Mg. The rolled copper alloy foil had a thickness of 18 μm and a tensile strength of 900 N/mm². Both sides of the rolled copper alloy foil were roughened by an electrolytic treatment with copper so that the resultant negative electrode current collector had a thickness of 21 μm and a 10-point mean surface roughness Rz of 1.5 μm.

Then, the above-described negative electrode mixture slurry was applied onto both sides of the resultant negative electrode current collector and then dried. Thus, a negative electrode mixture layer was formed on each side of the negative electrode current collector. At this point, the electrode thickness was 86 μm.

Thereafter, the resultant material was cut out into a 380 mm×52 mm rectangular shape and was pressure-rolled using pressure rollers with a linear load of 1.0×10³ kg/cm so that the electrode thickness became 60 μm. Thereafter, the resultant material was sintered at 400° C. for 1 hour under an argon atmosphere. Thus, a negative electrode was prepared. After having been sintered, the tensile strength of the negative electrode current collector was 750 N/mm².

Figure 1:
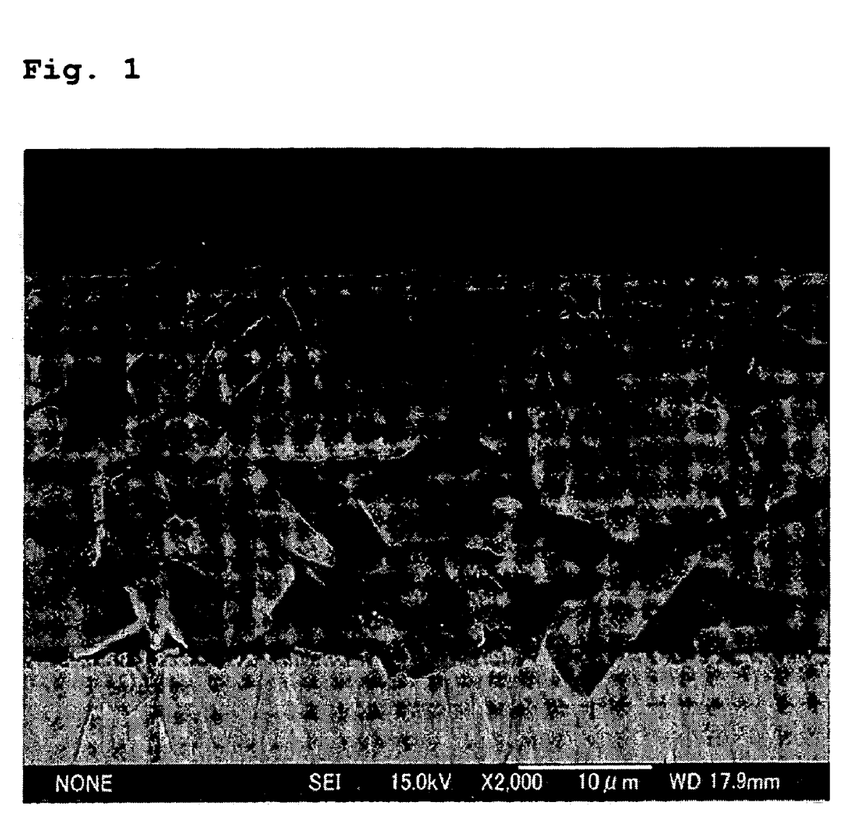
FIG. 1 is a scanning electron micrograph showing the condition of the negative electrode prepared in the manner described in Example 1.

A cross section of the negative electrode prepared in the above-described manner was observed with a scanning electron microscope (SEM). The result is shown in FIG. 1.

As seen from the figure, in the negative electrode prepared in the above-described manner, there were several locations in which negative electrode active material particles were partially embedded in the negative electrode current collector at a depth of 0.1 μm or more.

Preparation of Positive Electrode

A positive electrode active material was prepared in the following manner. $Li_2CO_3$ and $CoCo_3$ were weighed so that the atomic ratio Li:Co became 1:1, and they were mixed together in a mortar. The mixture was pressure-formed by pressing with a 17 mm diameter stamping die and thereafter sintered in the air at a temperature of 800° C. for 24 hours to produce a sintered material of $LiCoO_2$. The sintered material of $LiCoO_2$ was pulverized in a mortar to thus obtain a $LiCoO_2$ powder having an average particle size of 20 μm.

90 parts by weight of the positive electrode active material particles composed of the resultant $LiCoO_2$ powder was mixed with 5 parts by weight of artificial graphite powder serving as a conductive agent and a 5 weight % N-methylpyrrolidone solution containing 3 parts by weight of polyvinylidene fluoride serving as a binder agent. Thus, a positive electrode mixture slurry was prepared.

Next, the resultant positive electrode mixture slurry was applied onto both sides of a positive electrode current collector made of an aluminum foil, and then dried. The resultant material was pressure-rolled and thereafter cut out into a size of 402 mm×50 mm. Thus, a positive electrode was prepared, in which a positive electrode mixture layer was formed on each side of the positive electrode current collector.

Preparation of Non-Aqueous Electrolyte

A non-aqueous electrolyte solution was prepared in the following manner. $LiPF_6$ was dissolved at a concentration of 1 mole/liter into a mixed solvent of a 3:7 volume ratio of ethylene carbonate and diethylene carbonate, and carbon dioxide was then blown into the resultant for 10 minutes at 25° C. to dissolve carbon dioxide therein to the saturation point.

Preparation of Lithium Secondary Battery

Figure 2A:
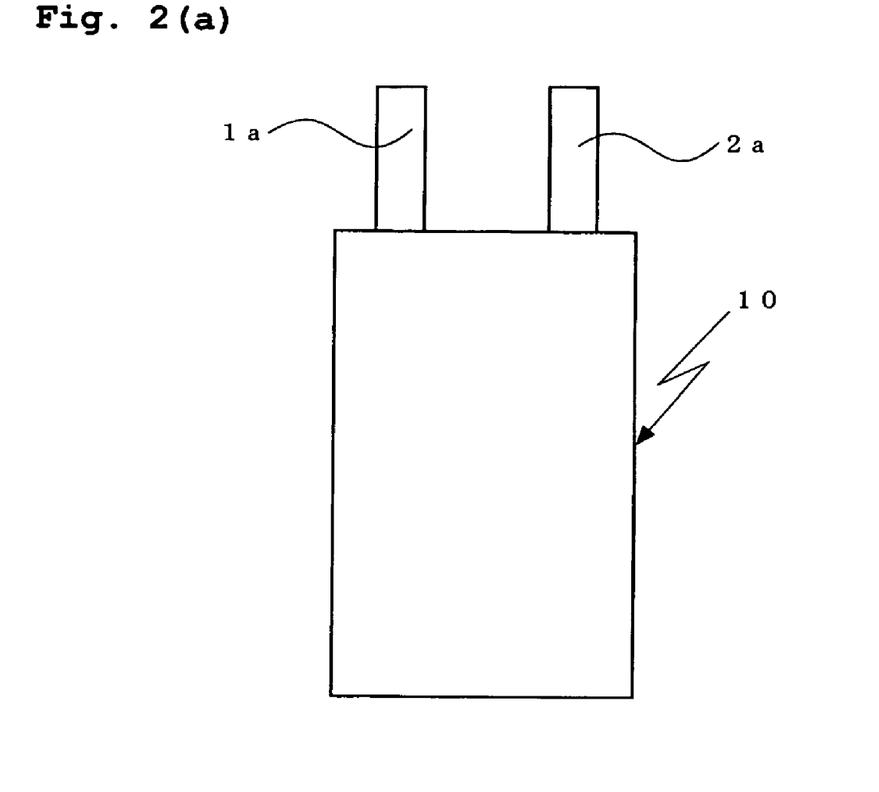
FIG. 2 shows a schematic plan view and a partial cross-sectional view illustrating an electrode assembly prepared for the examples and comparative examples.
Figure 2B:
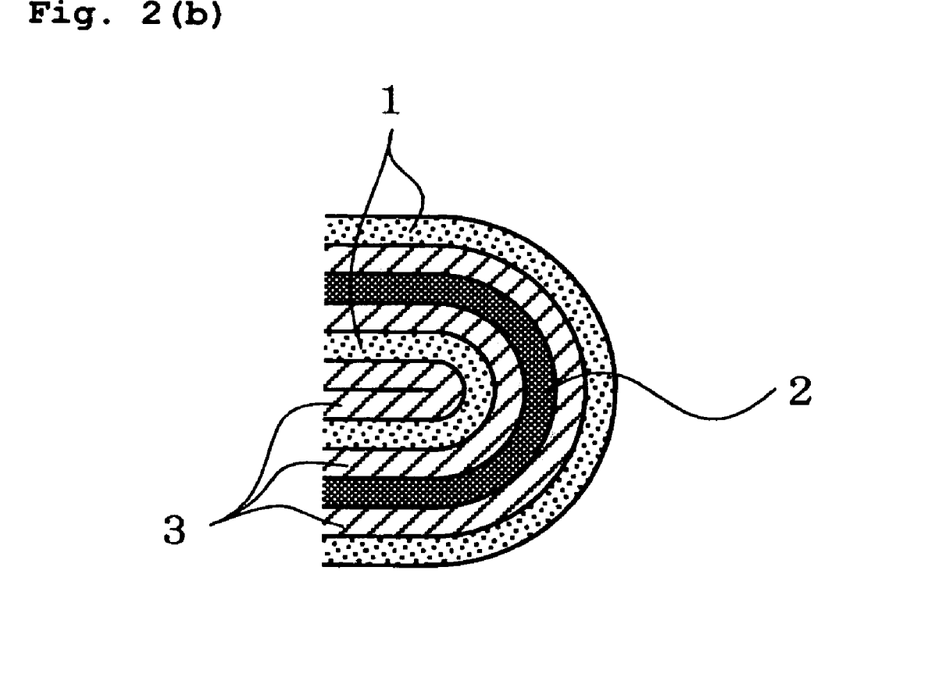

A lithium secondary battery was prepared in the following manner. Referring to FIGS. 2(A) and 2(B), a positive electrode current collector tab 1a made of aluminum was attached to the above-described positive electrode 1, and a negative electrode current collector tab 2a made of nickel was attached to the above-described negative electrode 2. Then, the positive electrode 1 and the negative electrode 2 were wound together with a separator 3 made of porous polyethylene so that the separator 3 is interposed between the positive electrode 1 and the negative electrode 2. Thus, an electrode assembly 10 was prepared.

Figure 3:
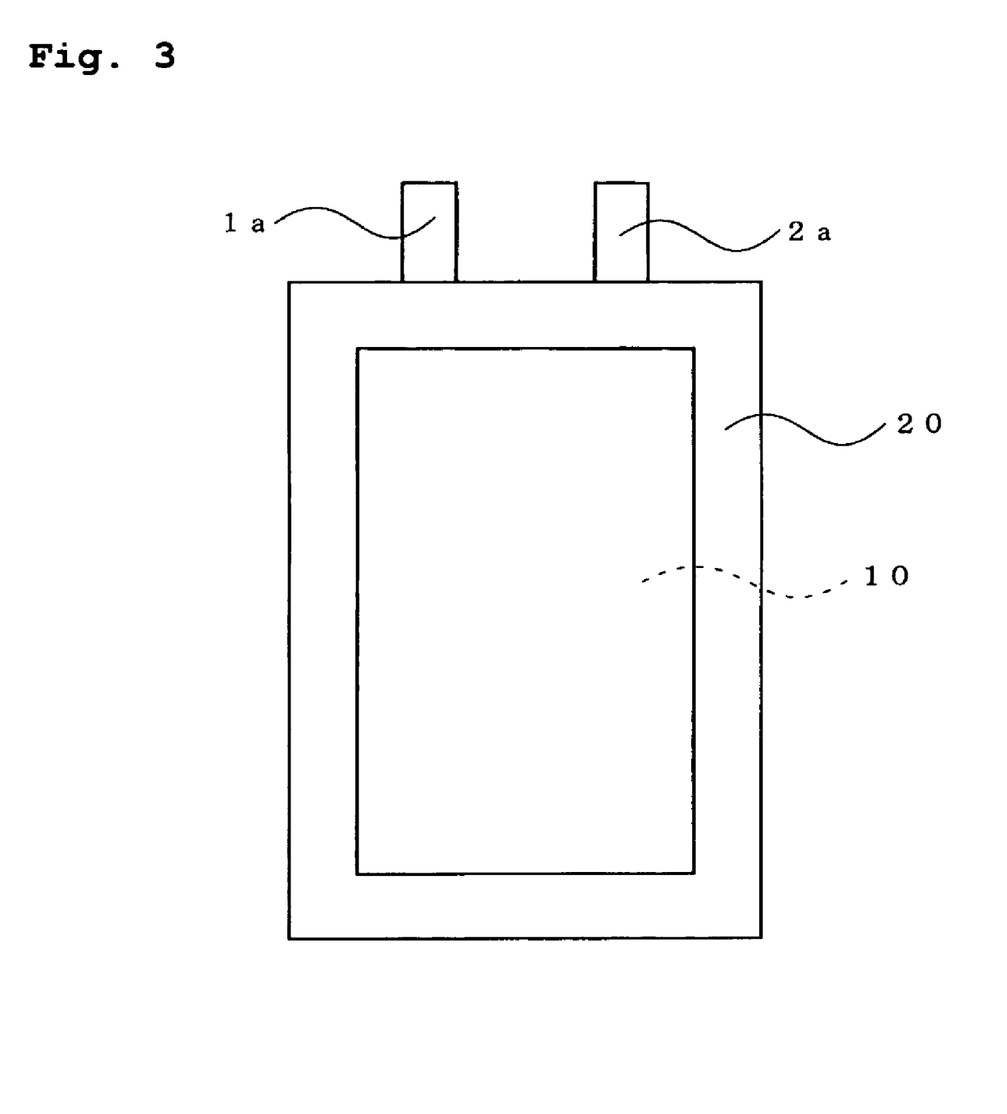
FIG. 3 is a schematic plan view illustrating a lithium secondary battery prepared for the examples and comparative examples.

Next, as illustrated in FIG. 3, the electrode assembly 10 thus prepared was put into a battery case 20 made of an aluminum laminate film, and the foregoing non-aqueous electrolyte solution was filled into the battery case 20. Thereafter, the opening of the battery case 20 was sealed in such a manner that the positive electrode current collector tab 1a and the negative electrode current collector tab 2a were extended outside.

Comparative Example 1

In Comparative Example 1, a lithium secondary battery was fabricated in the same manner as in the foregoing Example 1, except that, in the step of pressure-rolling the negative electrode using pressure rollers with a linear load of 1.0×103 kg/cm, the negative electrode was pressure-rolled so that the electrode thickness became 70 μm.

Figure 4:
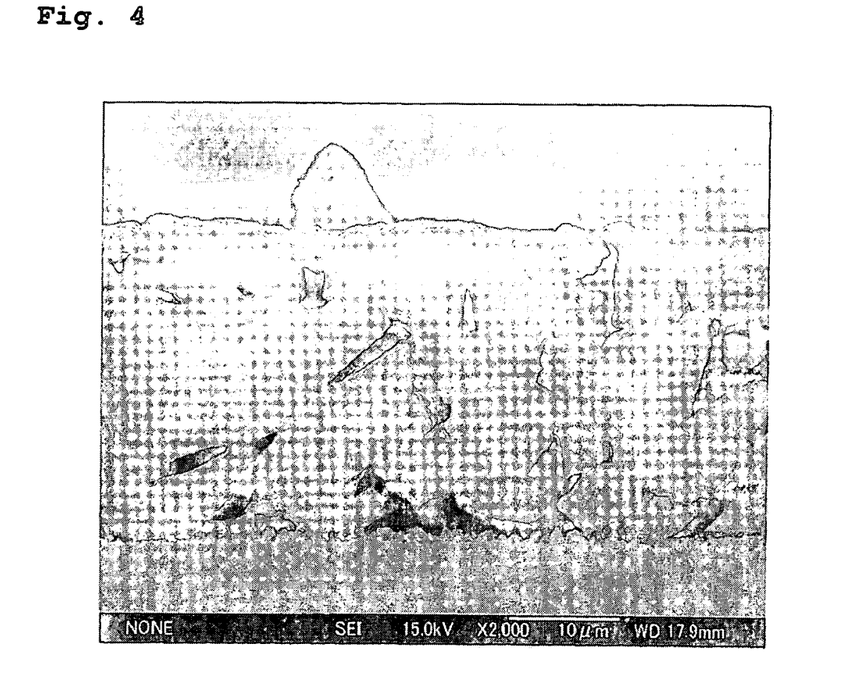
FIG. 4 is a scanning electron micrograph showing the condition of the negative electrode prepared in the manner described in Comparative Example 1.

Then, a cross section of the negative electrode prepared in Comparative Example 1 was observed with a scanning electron microscope (SEM). The result is shown in FIG. 4.

Consequently, as clearly seen from the figure, it was found that no negative electrode active material particles were embedded in the negative electrode current collector.

Next, each of the lithium secondary batteries of Example 1 and Comparative Example 1 prepared in the respective above-described manners was charged at a current of 1000 mA to 4.2 V in a 25° C. atmosphere, and thereafter discharged at a current of 1000 mA to 2.75 V. This charge-discharge cycle was repeatedly carried out, to obtain the number of cycles at which the discharge capacity reached 70% of the discharge capacity of the first cycle. The number of cycles thus obtained was defined as the cycle life of each battery. The results are shown in Table 1 below, in which the cycle life of each of the batteries is expressed by a relative index with respect to the cycle life of the lithium secondary battery of Example 1, which was regarded as 100.

TABLE 1

|  | Negative electrode current collector | | Negative electrode active material particles embedded in negative electrode current collector | Cycle life |
| --- | --- | --- | --- | --- |
|  | Roughening | Tensile strength before sintering |  |  |
| Ex. 1 | Yes | 900 N/mm² | Yes | 100 |
| Comp. Ex. 1 | Yes | 900 N/mm² | No | 75 |

The results clearly demonstrate that the lithium secondary battery of Example 1, which used the negative electrode in which negative electrode active material particles are partially embedded in the negative electrode current collector, exhibited a significant improvement in cycle life over the lithium secondary battery of Comparative Example 1, which used the negative electrode in which no negative electrode active material particles were embedded in the negative electrode current collector.

It is believed that the improvement was achieved because, by embedding negative electrode active material particles in the negative electrode current collector as described above, adhesion between the negative electrode mixture layer and the negative electrode current collector was enhanced. Moreover, it is believed that by partially embedding negative electrode active material particles in the negative electrode current collector as described above, the negative electrode active material particles were brought into direct contact with the negative electrode current collector; thus, the resistance of the negative electrode was reduced, and the load characteristics were also improved.

Example 2

In Example 2, in the preparation of the negative electrode, the negative electrode current collector was prepared using a rolled copper alloy foil that was made of a Cu—Ni—Si—Mg alloy containing 3 wt. % Ni, 0.65 wt. % Si, and 0.15 wt. % Mg and that had a thickness of 18 μm and a tensile strength of 900 N/mm2, as in Example 1. However, the rolled copper alloy foil was not subjected to a roughening process. Except for the use of the negative electrode current collector thus prepared, a lithium secondary battery of Example 2 was fabricated in the same manner as described in Example 1 above.

Figure 5:
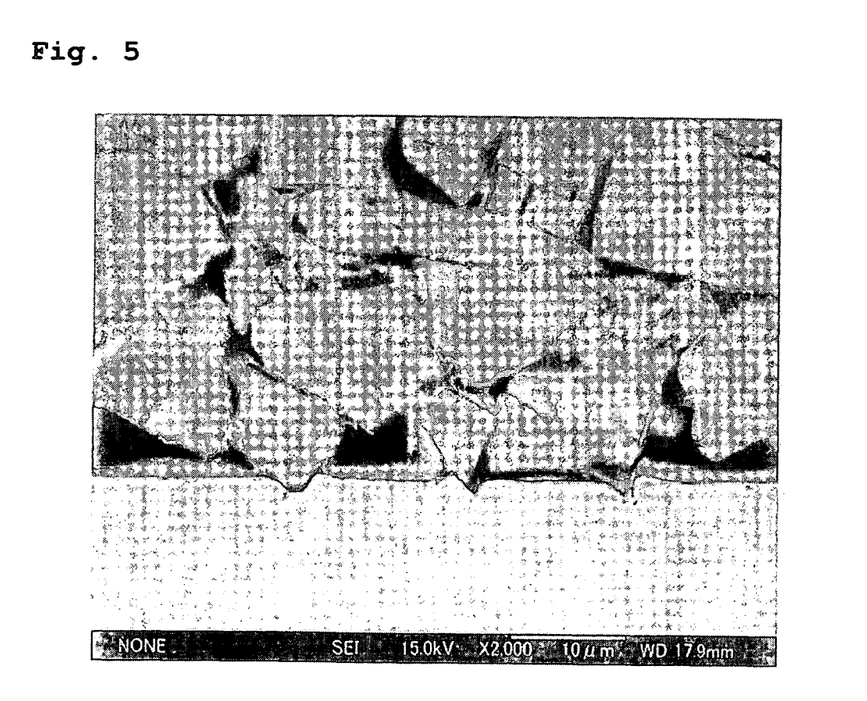
FIG. 5 is a scanning electron micrograph showing the condition of the negative electrode prepared in the manner described in Example 2.

Then, a cross section of the negative electrode prepared in Example 2 was observed with a scanning electron microscope (SEM). The result is shown in FIG. 5.

As seen from the figure, in the negative electrode prepared in Example 2 as well, there were several locations in which negative electrode active material particles were partially embedded in the negative electrode current collector at a depth of 0.1 μm or more, as in the case of the negative electrode of Example 1.

Example 3

In Example 3, a negative electrode was prepared in the manner described in Example 1, except for the following. In the preparation of the negative electrode mixture slurry, graphite powder having an average particle size of 3 μm was used as the conductive powder. This conductive powder, the foregoing negative electrode active material particles, and the foregoing binder were mixed together at a weight ratio of 87:10:3, to prepare a negative electrode mixture slurry. The negative electrode current collector used was made of a rolled copper alloy foil composed of a Cu—Ni—Si—Mg alloy containing 3 wt. % Ni, 0.65 wt. % Si, and 0.15 wt. % Mg, and the copper alloy foil had a thickness of 18 μm and a tensile strength of 900 N/mm², as in Example 1. However, the rolled copper alloy foil was not subjected to a roughening process. Except for the use of the just-described negative electrode mixture slurry and the just-described negative electrode current collector, a lithium secondary battery of Example 3 was fabricated in the same manner as described in Example 1 above.

Then, a cross section of the negative electrode prepared in Example 3 was observed with a scanning electron microscope (SEM). Consequently, it was observed that there were several locations in which negative electrode active material particles were partially embedded in the negative electrode current collector at a depth of 0.1 μm or more, as in the case of the negative electrode of Example 2.

Example 4

In Example 4, in the preparation of the negative electrode, a rolled copper alloy foil made of a Cu—Zr alloy containing 0.02 wt. % Zr was used as the negative electrode current collector. The rolled copper alloy foil had a thickness of 18 μm and a tensile strength of 450 N/mm². The rolled copper alloy foil was used as the negative electrode current collector without being subjected to a roughening process. Except for the use of the just-described negative electrode current collector, a lithium secondary battery of Example 4 was fabricated in the same manner as described in Example 1 above.

Comparative Example 2

In Comparative Example 2, in the preparation of the negative electrode, a rolled copper alloy foil composed of a Cu—Ni—Si—Mg alloy containing 3 wt. % Ni, 0.65 wt. % Si, and 0.15 wt. % Mg, the rolled copper alloy foil having a thickness of 18 μm and a tensile strength of 900 N/mm², was used as the negative electrode current collector without subjecting the rolled copper alloy foil to a roughening process, as in the case of Example 2 above. The negative electrode was pressure-rolled with pressure rollers in the same manner as described in Comparative Example 1. Except for the use of the negative electrode thus prepared, a lithium secondary battery of Comparative Example 2 was fabricated in the same manner as described in Example 1 above.

Figure 6:
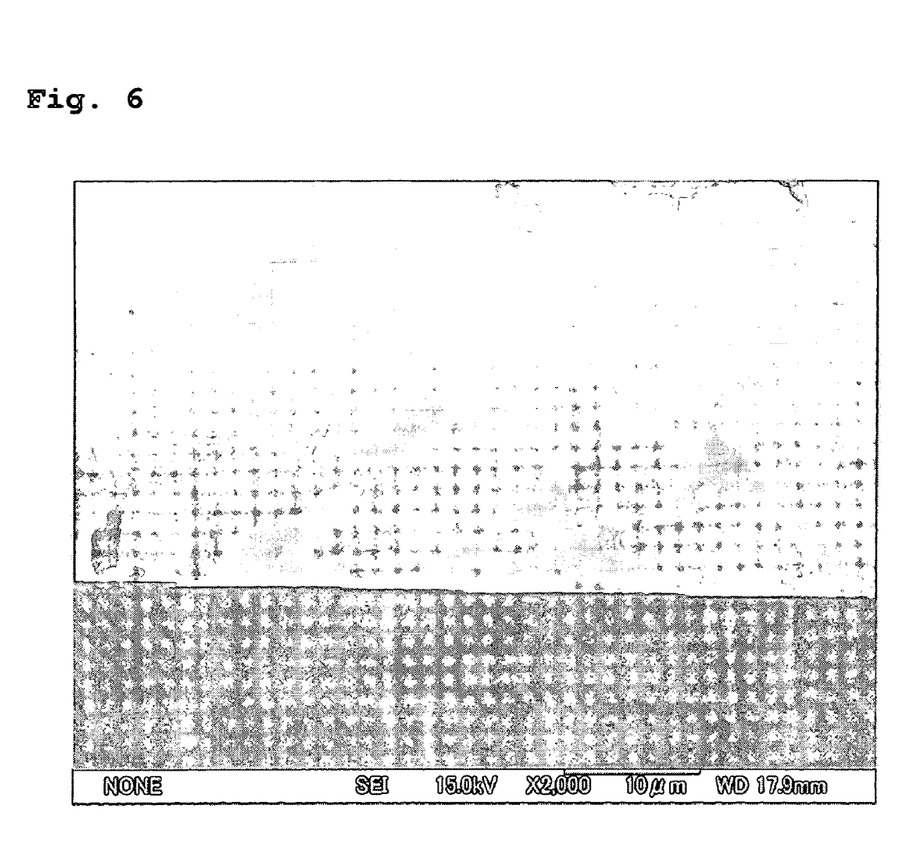
FIG. 6 is a scanning electron micrograph showing the condition of the negative electrode prepared in the manner described in Comparative Example 2.

Then, a cross section of the negative electrode prepared in Comparative Example 2 was observed with a scanning electron microscope (SEM). The result is shown in FIG. 6.

Consequently, as clearly seen from the figure, it was found that no negative electrode active material particles were embedded in the negative electrode current collector.

Next, each of the lithium secondary batteries of Examples 2 to 4 and Comparative Example 2 was charged and discharged repeatedly in the same manner as described in Example 1 to measure the number of cycles at which the discharge capacity reached 70% of the discharge capacity of the first cycle. The results are shown in Table 2 below, in which the cycle life of each of the batteries is expressed by a relative index with respect to the cycle life of the lithium secondary battery of Example 1, which was regarded as 100.

Further, the lithium secondary batteries of Examples 1 to 4 and Comparative Example 2 were disassembled to determine whether or not wrinkles developed in the respective negative electrode current collectors of their negative electrodes. The results are also shown in Table 2.

Further, for each of the lithium secondary batteries of Examples 1 to 3, the first cycle discharge capacity Q1 and the 30th cycle discharge capacity Q30 were obtained to determine the capacity retention ratio at the 30th cycle, which was calculated from the following equation. The results are also shown in Table 2.

Capacity retention ratio(%)=(Q30/Q1)×100 parable to that of the lithium secondary battery of Example 1, which used the negative electrode current collector the surfaces of which were roughened.

As for the lithium secondary battery of Example 4, which used a rolled copper alloy foil having a tensile strength of 450 N/mm$^2$ as the negative electrode current collector, wrinkles developed in the negative electrode current collector after the charge-discharge cycle operations, and the cycle life was lower than that of the lithium secondary batteries of Examples 2 and 3. Nevertheless, the lithium secondary battery of Example 4 showed a better cycle life than that of the lithium secondary battery of Comparative Example 2, which used a negative electrode in which no negative electrode active material particles were embedded in the negative electrode current collector.

The lithium secondary battery of Example 1, which used the negative electrode current collector the surfaces of which were roughened, showed a higher capacity retention ratio at the 30th cycle than the lithium secondary battery of Example 2, which used the negative electrode current collector made of a rolled copper alloy foil the surfaces of which were not roughened. However, as seen in the lithium secondary battery of Example 3, addition of a conductive powder to the negative electrode mixture layer made it possible to improve the capacity retention ratio at the 30th cycle significantly even with the use of a rolled copper alloy foil the surfaces of which were not roughened as the negative electrode current collec-

TABLE 2

| | Negative electrode current collector | | Negative electrode active material particles embedded in negative electrode current collector | Conductive particles | Cycle life | Wrinkles | Capacity retention ratio (%) |
|---|---|---|---|---|---|---|---|
| | Roughening | Tensile strength before sintering | | | | | |
| Ex. 1 | Yes | 900 N/mm$^2$ | Yes | No | 100 | No | 87 |
| Ex. 2 | No | 900 N/mm$^2$ | Yes | No | 96 | No | 81 |
| Ex. 3 | No | 900 N/mm$^2$ | Yes | Yes | 95 | No | 94 |
| Ex. 4 | No | 450 N/mm$^2$ | Yes | No | 64 | Yes | Not measured |
| Comp. Ex. 2 | No | 900 N/mm$^2$ | No | No | 41 | No | Not measured |

The lithium secondary batteries of Examples 2 and 3 were compared with the lithium secondary battery of Comparative Example 2, all of which used the same rolled copper alloy foil having a tensile strength of 900 N/mm$^2$ as their negative electrode current collector. Consequently, it was found that the lithium secondary batteries of Examples 2 and 3, each of which used the negative electrode in which negative electrode active material particles were partially embedded in the negative electrode current collector, exhibited a significant improvement in cycle life over the lithium secondary battery of Comparative Example 2, which used the negative electrode in which no negative electrode active material particles were embedded in the negative electrode current collector.

As seem from the results for the lithium secondary batteries of Examples 2 and 3, even with the use of the negative electrode current collector made of a rolled copper alloy foil the surfaces of which were not roughened, the use of the negative electrode in which negative electrode active material particles were partially embedded in the negative electrode current collector made it possible to obtain a cycle life comtor. The lithium secondary battery of Example 3 showed a higher 30th cycle capacity retention ratio than that of the lithium secondary battery of Example 1, which used the negative electrode current collector the surfaces of which were roughened.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

This application claims priority of Japanese patent application Nos. 2006-014514 and 2006-051438 filed Jan. 24 and Feb. 28, 2006, respectively, each of which is incorporated herein by reference.

What is claimed is:

1. A negative electrode for a lithium secondary battery, comprising:
    a negative electrode current collector having a tensile strength of from 450 N/mm$^2$ to 1000 N/mm$^2$ after having been sintered; and
    a negative electrode mixture layer sintered on a surface of the negative electrode current collector and composed of a binder and negative electrode active material particles of silicon and/or a silicon alloy, wherein
    negative electrode active material particles are partially embedded in the negative electrode current collector such that at least one negative electrode active material particle is partially embedded at a depth of 0.1 μm per 1 mm of length of a flat surface portion of the negative electrode current collector.

2. The negative electrode according to claim 1, wherein the negative electrode current collector is made of one foil selected among a copper foil, a copper alloy foil, and a metal foil on a surface of which a copper layer or a copper alloy layer is formed.

3. The negative electrode according to claim 1, wherein the negative electrode active material particles are silicon particles.

4. The negative electrode according to claim 2, wherein the negative electrode active material particles are silicon particles.

5. The negative electrode according to claim 1, wherein a conductive powder is added to the negative electrode mixture layer.

6. The negative electrode according to claim 5, wherein the conductive powder comprises graphite.

7. The negative electrode according to claim 2, wherein a conductive powder comprising graphite is added to the negative electrode mixture layer.

8. The negative electrode according to claim 3, wherein a conductive powder comprising graphite is added to the negative electrode mixture layer.

9. The negative electrode according to claim 4, wherein a conductive powder comprising graphite is added to the negative electrode mixture layer.

10. The negative electrode according to claim 5, wherein the conductive powder has an average particle size of from 1 μm to 10 μm.

11. The negative electrode according to claim 1, wherein the negative electrode mixture layer is sintered at a temperature that is higher than the glass transition temperature of the binder in the negative electrode mixture layer.

12. The negative electrode according to claim 11, wherein the negative electrode mixture layer is sintered at a temperature from 250 to 450° C.

13. The negative electrode according to claim 1, wherein the binder is polyimide.

14. A method of manufacturing a negative electrode for a lithium secondary battery, comprising:
    applying a negative electrode mixture slurry composed of a binder and negative electrode active material particles of silicon and/or a silicon alloy onto a surface of a negative electrode current collector, to form a negative electrode mixture layer;
    pressure-rolling the negative electrode current collector on which the negative electrode mixture layer is formed, to partially embed negative electrode active material particles into the negative electrode current collector; and
    sintering the negative electrode mixture layer.

15. The method according to claim 14, wherein the negative electrode mixture layer is sintered under a non-oxidizing atmosphere.

16. The method according to claim 14, wherein the negative electrode mixture layer is sintered at a temperature that is higher than the glass transition temperature of the binder in the negative electrode mixture layer.

17. The method according to claim 16, wherein the negative electrode mixture layer is sintered at a temperature from 250 to 450° C.

18. The method according to claim 14, wherein the binder is polyimide.

19. A lithium secondary battery comprising;
    a positive electrode;
    a non-aqueous electrolyte; and
    a negative electrode according to claim 1.

* * * * *